United States Patent
Gu

(10) Patent No.: US 9,025,686 B2
(45) Date of Patent: May 5, 2015

(54) METHOD, RADIO UNIT AND RADIO BASE STATION FOR ADJUSTING THRESHOLDS FOR CREST FACTOR REDUCTION

(75) Inventor: Tao Gu, Beijing (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/982,413

(22) PCT Filed: Feb. 17, 2011

(86) PCT No.: PCT/CN2011/000245
§ 371 (c)(1),
(2), (4) Date: Jul. 29, 2013

(87) PCT Pub. No.: WO2012/109768
PCT Pub. Date: Aug. 23, 2012

(65) Prior Publication Data
US 2013/0329819 A1    Dec. 12, 2013

(51) Int. Cl.
*H04L 5/12* (2006.01)
*H04L 27/08* (2006.01)
*H04L 27/26* (2006.01)
*H04L 27/36* (2006.01)

(52) U.S. Cl.
CPC ............ *H04L 27/08* (2013.01); *H04L 27/2623* (2013.01); *H04L 27/366* (2013.01)

(58) Field of Classification Search
CPC .............. H03F 2200/258; H04B 2201/70706; H04B 1/10; H04L 27/2623; H04L 27/08; H04L 27/2614; H04L 27/2647; H04L 27/2626; H04L 27/2624; H04L 27/366; H04L 27/3411; H04L 2025/03414

USPC .......................... 375/297, 260, 316, 261, 264; 455/114.3, 114.2, 127.1
See application file for complete search history.

(56) References Cited

U.S. PATENT DOCUMENTS 8,340,210 B2 * 12/2012 Haddad ......................... 375/295
2012/0321018 A1 * 12/2012 Chen et al. .................... 375/296

FOREIGN PATENT DOCUMENTS

| CN | 101035105 A | | 9/2007 | |
|----|----|----|----|----|
| CN | 101562478 A | | 10/2009 | |
| CN | 101729475 A | * | 6/2010 | .............. H04L 27/26 |
| CN | 101888361 A | | 11/2010 | |
| JP | 2010098734 A | * | 4/2010 | .............. H04L 27/26 |

* cited by examiner

*Primary Examiner* — Rahel Guarino
(74) *Attorney, Agent, or Firm* — Coats & Bennett, PLLC

(57) ABSTRACT

The present invention relates to clipping thresholds adjustment for Crest Factor Reduction CFR in a radio unit, wherein the radio unit comprises one or more clipping stages that apply respective clipping thresholds to clip input signals, comprising: determining a target threshold for the clipping stages based on a target PAR and the amplitudes or powers of the input signals, estimating the direction in which original PAR of the input signals changes by comparing amplitudes of the clipped signals from the clipping stages with the target threshold, and adjusting the clipping thresholds based on the estimated direction. The present invention also relates to dynamic stage control. With the present invention, clipping thresholds and clipping stages are adaptively changes with dynamic original PAR of input signals and the efficiency of power amplifier is increased with a low implementation cost.

20 Claims, 4 Drawing Sheets

METHOD, RADIO UNIT AND RADIO BASE STATION FOR ADJUSTING THRESHOLDS FOR CREST FACTOR REDUCTION

TECHNICAL FIELD

The present invention relates generally to the field of wireless communication, and particularly to a method and apparatus for adjusting the thresholds for crest factor reduction (CFR) and a radio unit and radio base station associated therewith.

BACKGROUND

In modern communication systems, high order modulations like 16QAM (Quadrature Amplitude Modulation) and 64QAM are adopted. Downlink transmitted signals are generated by adding up multiple statistically independent signals (for different users and carriers), which lead to high peak to average power ratio (PAR).

In order to increase power amplifier efficiency and to better utilize DAC (Digital Analog Converter) dynamic range, many CFR algorithms are used to reduce PAR of transmitted signal in Radio Unit side. Noise shaping and peak cancellation are two CFR algorithms in digital IF (Intermediate Frequency) domain. The similarity of the two algorithms is to use cascaded clipping stages to reduce PAR gradually. Different clipping stages have different clipping thresholds in order to achieve an optimal EVM (Error Vector Magnitude) result. Different sets of clipping thresholds are needed for IF signals that have different PAR values. For example, simulation results show clipping thresholds for multi-stage Noise shaping should follow an arithmetic series in order to achieve the optimal result.

Currently, one set of clipping thresholds will be fixed and applied to respective clipping stages after setup of one configuration, which clipping thresholds are determined in assumption of fixed original PAR and target PAR values for signals to be transmitted. Hereinafter, original PAR refers to PAR of signals before clipping, i.e. PAR of signals to be input into clipping stages, while target PAR refers to a target PAR of signals after clipping, i.e. an expected PAR of clipped signals from clipping stages. Both original PAR and target PAR are defined at certain probability point of CCDF (Complementary Cumulative Distribution Function) curve. Generally, the original PAR and the target PAR are in dB and are defined at probability $10^{-4}$.

However, due to changes of factors like carriers, the number of users and modulation types (QPSK, 16QAM or 64QAM), said original PAR after carrier combination will change. In this case, problem will arise with fixed clipping thresholds, since fixed thresholds will not adapt to change of original PAR, and then such a solution will not be an optimal solution for the balance between PAR reduction and EVM.

SUMMARY

An object of the present invention is to provide an improved method, apparatus, radio unit, and radio unit for adjusting the thresholds for crest factor reduction CFR, which obviates at least the above-mentioned disadvantage.

According to a first aspect of the present invention, the present invention provides a method for adjusting clipping thresholds for Crest Factor Reduction CFR in a radio unit. The radio unit comprises one or more clipping stages that apply respective clipping thresholds to clip input signals. The method comprises: determining a target threshold for the clipping stages based on a target PAR and amplitudes or powers of the input signals, estimating the direction in which original PAR of the input signals changes by comparing amplitudes of the clipped signals from the clipping stages with the target threshold, and adjusting the clipping thresholds based on the estimated direction.

According to the present invention, since clipping thresholds of clipping stages are adjusted to input signals with varying original PAR and may always be tuned to optimal points, signals after clipping have optimal EVM for target PAR.

Preferably, according to one embodiment of the present invention, the direction is estimated by the following steps: counting the number of clipped samples of the clipped signals of which amplitudes exceed the target threshold for a counting time period, generating a first count value, and if the first count value is higher than a predetermined upper limit, then the direction is estimated as increase, or if the first count value is lower than a predetermined lower limit, then the direction is estimated as decrease.

Preferably, according to another embodiment of the present invention, if the estimated direction is to increase, adjusting the clipping thresholds to clip more signals, or if the estimated direction is to decrease, adjusting the clipping thresholds to clip less signals.

Preferably, the adjusted clipping threshold $Th_i'$ for clipping stage i is calculated as follows:

$Th_i' = Th_i + n_i \cdot \Delta step$, where $i=1$ to $N$ $\Delta step = 0.1$ dB $n_i \in \{0, \pm 1, \pm 2, \ldots, \pm \lfloor \Delta Th/(2 \cdot \Delta step) \rfloor\}$ $\Delta Th = Th_i - Th_{i+1} = f(PAR_t, PAR_o, N)$ where $Th_i$ is the initial clipping threshold for the clipping stage i, $\Delta step$ is the minimal step size for one adjustment, $n_i$ is a weighting factor, $PAR_t$ is the target PAR, $PAR_o$ is the original PAR, and N is the number of clipping stages in use.

Preferably, the target threshold $Th_t$ is determined as:

$$Th_t = \sqrt{P_{RAT} \cdot 10^{\frac{PAR_t}{10}}},$$

wherein $P_{RAT}$ is the average power of input signals in digital domain before DAC corresponding to the rated transmit power of the radio unit, and $PAR_t$ is the target PAR.

Preferably, according to another embodiment of the present invention, the upper limit and lower limit are set as a function of the duration of the counting time period, a rate of the samples and a probability point of Complementary Cumulative Distribution Function curve where the target PAR is defined and measured.

Preferably, according to another embodiment of the present invention, the radio unit further comprises one or more measurement stages applying respective measurement thresholds, and in each measurement stage, amplitudes of samples of input signals are compared with the measurement threshold of the measurement stage, and the number of samples of which the amplitudes exceed the measurement threshold during a measuring time period is counted and a second count value is generated. The original PAR of the input signals is then estimated based on the second count value, a maximal allowable original PAR of the radio unit and the target PAR, and the number of clipping stages to be used is determined and one or more corresponding clipping stages are selected based on the estimated original PAR, the target PAR and a minimal PAR value for which all clipping stages in the radio unit are needed to guarantee the CFR performance requirement of the radio unit.

Since according to the present invention, the number of clipping stages may be dynamically controlled to be adaptive to the power or original PAR of the input signals and some clipping stages may be bypassed, the radio unit consumes less power for CFR.

Preferably, a measurement threshold for a measurement stages is determined based on a reference PAR assigned to respective measurement stage that is dependent on the maximal original PAR, the target PAR and the total number of measurement stages.

Preferably, if the number of selected clipping stages is changed, the initial clipping thresholds for the selected one or more clipping stages are recalculated based on the estimated original PAR and the target PAR.

Preferably, according to one embodiment of the present invention, the radio unit is of a Frequency Division Duplex system or a Time Division Duplex system, and the input signals are signals to be transmitted in downlink time slots when in a Time Division Duplex system.

According to a second aspect, the present invention provides an apparatus for adjusting thresholds for Crest Factor Reduction CFR in a radio unit. The radio unit comprises one or more clipping stages that apply respective clipping thresholds to clip input signals. The apparatus comprises a first determining unit for determining a target threshold for the clipping stages based on a target PAR and amplitudes or powers of the input signals, an estimating unit for estimating the direction in which original PAR of the input signals changes by comparing amplitudes of clipped signals from the clipping stages with the target threshold, and an adjustor for adjusting the clipping thresholds based on the estimated direction.

According to a third aspect, the present invention provides a radio unit comprising one or more clipping stages and an apparatus according to the present invention.

According to a fourth aspect, the present invention provides a radio base station comprising a radio unit according to the present invention.

The present invention is easy to implement and cost little resource, since only several e.g. multipliers, adders, comparators and some control logic etc. are needed.

BRIEF DESCRIPTION OF THE DRAWINGS

The foregoing and other objects, features, and advantages of the present invention will become more apparent from the following description of preferred embodiments and accompany drawings.

DETAILED DESCRIPTION

In the following description, for purposes of explanation rather than limitation, specific details, such as the particular architecture, interfaces, techniques, etc., are set forth for illustration. However, it will be apparent to those of ordinary skill in the art that other embodiments that depart from these specific details would still be understood to be within the scope of the present invention. Moreover, for the purpose of clarity, detailed descriptions of well-known devices, circuits, and methods are omitted so as not to obscure the description of the present invention. It should be expressly understood that the drawings are included for illustrative purposes and do not represent the scope of the present invention. In the accompanying drawings, like reference numbers in different drawings may designate similar elements.

Figure 1:
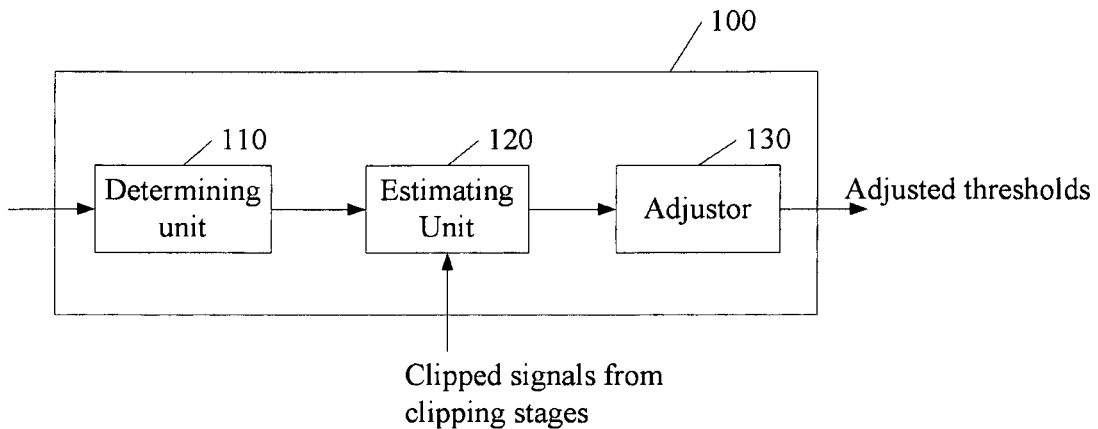
FIG. 1 schematically illustrates a block diagram of an apparatus according to an embodiment of the present invention.

FIG. 1 schematically illustrates a block diagram of an apparatus 100 according to an embodiment of the present invention. The apparatus 100 is used for adjusting thresholds for clipping stages in a system, like a (Remote) Radio Unit (R)RU of a Radio Base Station RBS. As shown in FIG. 1, the apparatus 100 comprises a determining unit 110, an estimating unit 120, and an adjustor 130 that are operatively coupled.

The determining unit 110 determines a target threshold for the clipping stages. The target threshold hereinafter refers to an expected clipping threshold when considering all clipping stages as a whole, in other words, the target threshold may be regarded as expected peak amplitude of clipped signals output from the clipping stages. The determination of the target threshold may be based on a target PAR and the amplitudes or powers of input signals.

As is known, the target PAR is a system requirement that may be different for different systems. The target PAR of a system is generally determined by original PAR of input signals, the performances of CFR and power amplifier in the system. For example, the target PAR may be calculated as:

$$PAR_t = PAR_o - \Delta PAR, \text{ and } PAR_t < PAR_{PA},$$

where $PAR_o$ is original PAR, $PAR_t$ is target PAR, $\Delta PAR$ is the amount of PAR reduced by CFR, and $PAR_{PA}$ is the maximal PAR at which the power amplifier can work with good linearity.

The amplitudes or powers of input signals may be represented by RMS (Root Mean Square) amplitudes for a set of samples of the input signals. The RMS amplitude varies slowly with the power of input signals and may be calculated by means of power meter. Then, preferably, the determining unit may determine the target threshold $Th_t$ as:

$$Th_t = A_{RMS} \cdot 10^{\frac{PAR_t}{20}},$$

Here, $PAR_t$ is the target PAR in dB, and $A_{RMS}$ is the RMS amplitude of samples of the input signals. $A_{RMS}$ for a set of amplitude samples $\{A_0, A_1, A_2, \ldots, A_{N-1}\}$ is defined as:

$$A_{RMS} = \sqrt{\frac{1}{N}\sum_{k=0}^{N-1} A_k^2} = \sqrt{\frac{1}{N}\sum_{k=0}^{N-1} (I_k^2 + Q_k^2)}.$$

Or alternatively, the amplitudes or powers of input signals may be indicated by $P_{RAT}$ that is the average power of input signals in digital domain before DAC corresponding to the rated transmit power of the system. $P_{RAT}$ is the maximal RMS power that corresponds to the maximal RMS amplitude of samples of the input signals. Then, the target threshold $Th_t$ may also be determined by:

$$Th_t = \sqrt{P_{RAT} \cdot 10^{\frac{PAR_t}{10}}}.$$

The estimating unit 120 estimates the direction in which original PAR ($PAR_o$) of the input signals changes by comparing the amplitudes of the clipped signals from clipping stages with the determined target threshold. The direction of $PAR_o$ change indicates whether $PAR_o$ increases or decreases, which determines whether to modify the clipping thresholds to clip more or less signals. If the direction indicates increase, the clipping thresholds may be modified to clip more signals, or if the direction indicates decrease, the clipping thresholds may be modified to clip less signals.

Preferably, the estimating unit 120 may comprise a counter that counts the number of clipped samples that have amplitudes above the target threshold and estimate the direction of original PAR change based on count value of the counter. The counting may last for a predetermined counting time period. Preferably, the predetermined counting time period is set at the order of 10 ms that is the length of one radio frame for wireless systems like TD-SCDMA, WCDMA and LTE. But as will be appreciated, the counting time period may be set to other values based on required precision of measurement.

Upon expiration of the predetermined counting time period, the counter generates a count value that is an indicative of the number of clipped samples that exceed the target threshold in the predetermined counting time period. The counter may be reset then, or alternatively, the counter may be reset before a new counting time period starts.

The adjustor 130 then adjusts the clipping thresholds of respective clipping stages based on the estimated direction of original PAR change, e.g. based on the count value from the counter. The adjusted clipping thresholds are then sent to respective clipping stages for updating their clipping thresholds. This will make the clipping stages more adaptive to original PAR of input signals and the clipped signals will have optimal EVM for target PAR.

According to one embodiment of the present invention, the apparatus 100 may be implemented in a (remote) radio unit, which radio unit may comprise one or more clipping stages that apply respective clipping thresholds to clip signals. The apparatus 100 may perform this dynamic threshold adjustment in a Frequency Divisional Duplex (FDD) system such as GSM, CDMA2000, WCDMA and FDD-LTE, or a Time Divisional Duplex (TDD) system such as TD-SCDMA or TD-LTE. When in a TDD system, the dynamic threshold adjustment is only done for downlink time slots. Accordingly, the counting time period should be determined according to the measurement time of downlink slots.

Figure 2:
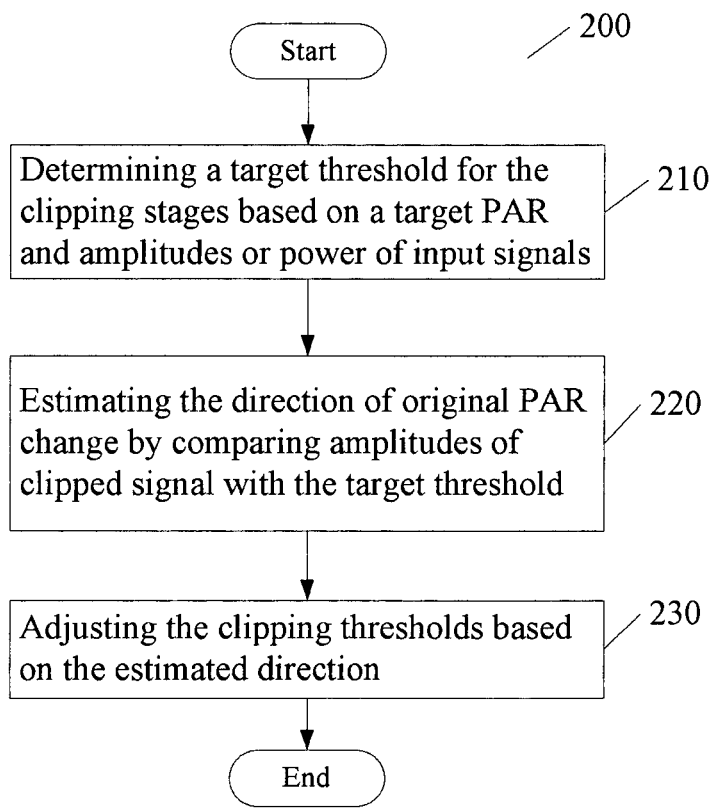
FIG. 2 schematically illustrates a flow chart of a method according to an embodiment of the present invention.

FIG. 2 illustrates a flow chart of a method 200 according to an embodiment of the present invention. The method 200 is for adjusting clipping thresholds for CFR in a radio unit, which radio unit comprises one or more clipping stages that apply respective clipping thresholds. The method 200 may be performed by the apparatus 100 as illustrated in FIG. 1.

As shown in FIG. 2, in step 210, a target threshold is determined for the clipping stages based on a target PAR of the radio unit and amplitudes or powers of input signals into the clipping stages. Then, the direction in which original PAR of the input signals changes is estimated by comparing the amplitude of clipped signals with the determined target threshold in step 220. In step 230, the clipping thresholds are adjusted based on the estimated direction. The adjusted clipping thresholds are then applied to respective clipping stages for subsequent clipping.

Figure 3:
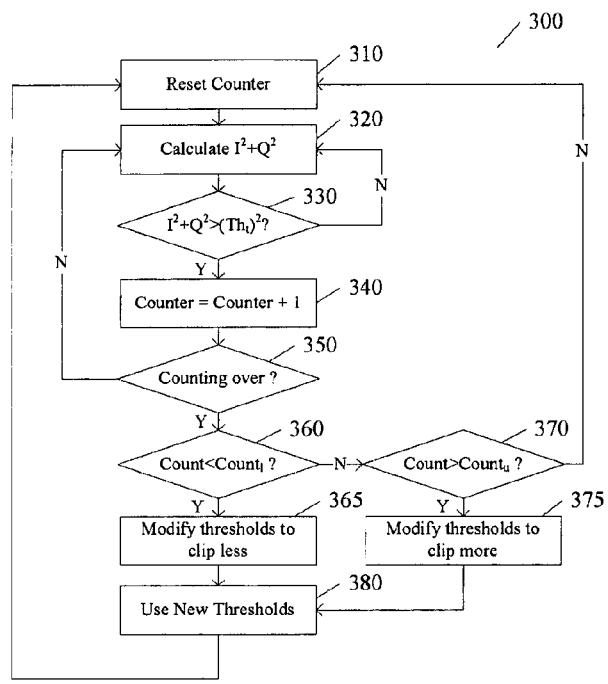
FIG. 3 illustrates in more detail a process of dynamic threshold adjustment according to the present invention.

FIG. 3 illustrate in more detail a process 300 of dynamic threshold adjustment according to an embodiment of the present invention.

As shown in FIG. 3, in step 310, a counter is reset before a new counting time period starts, but as will be understood, the counter may be reset at other appropriate time points, e.g. after the counting is over.

In step 320, the amplitudes of clipped samples of clipped signals are determined based on $I^2+Q^2$, here I and Q respectively designate I components and Q components of the clipped signals. If it is determined in step 330 that the amplitude of a clipped sample exceeds the target threshold $Th_t$, e.g. $(I^2+Q^2)$ is larger than $(Th_t)^2$, the counter is increased by one in step 340. A predetermined counting time period is monitored to determine whether to end the counting in step 350. If no, the counting will continue. Otherwise, the counting is over and a count value will be generated by the counter to indicate the number of clipped samples that have amplitudes above the target threshold $Th_t$ during this counting time period.

In order to estimate the direction in which the original PAR changes, according to one embodiment of the present invention, the count value is compared with a lower limit and an upper limit in steps 360 and 370, respectively. The lower limit and the upper limit defines a range for count values, a count value within this range may indicate that current clipping thresholds are appropriate for respective clipping stages.

The lower limit ($Count_l$) and the upper limit ($Count_u$) may preferably be set based on the predetermined counting time period, a rate of the clipped samples and a certain probability point of CCDF curve where the $PAR_t$ is defined and measured. For example, $Count_l$ and $Count_u$ are set using following equations.

$$Count_l = \lfloor T_m \times Fs \times 10^{-4} \rfloor$$

$$Count_u = 2 \times Count_l$$

where $T_m$ is duration of the predetermined counting time period, Fs is the rate of clipped samples, $10^{-4}$ is the probability point where $PAR_t$ is generally defined and measured.

When adjusting the clipping thresholds, if the count value is lower than the lower limit, then the estimated direction of original PAR change is decrease and the clipping thresholds are modified to clip less signals in step 365. If the count value is higher than the upper limit, then the estimated direction of original PAR change is increase and the clipping thresholds are modified to clip more signals in step 375. Otherwise, all clipping thresholds remain unchanged. The modified new clipping thresholds are used by the clipping stages for subsequent clipping in step 380.

There are many ways to recalculate the adjusted clipping thresholds for respective clipping stages. According to one embodiment, the clipping thresholds may be adjusted dependent on a step size set for each adjustment and the target PAR ($PAR_t$).

The step size for each adjustment may be no more than a pre-defined value, e.g. +/−0.1 dB, in order to tune the clipping thresholds with fine resolution. Moreover, preferably, the clipping thresholds may be only tunable within a certain range, e.g. 6.0-10.0 dB, to guarantee both reasonable EVM and $PAR_t$. $PAR_t$ may remain unchanged during the adjustment of clipping thresholds. However, since the target PAR determines the power amplifier back off point and efficiency, a fixed target PAR may limit the possibility to increase power amplifier efficiency for signals having low power and low original PAR. Then, alternatively, the target PAR may be changed, e.g. in the same direction as $PAR_o$. A dynamic $PAR_t$ enables to increase power amplifier efficiency when signals with low power or low $PAR_o$ are to be transmitted. Thus, it is possible to decrease power amplifier back-off and increase power amplifier efficiency.

The step size may be of a predefined value, or alternatively, the step size may be adaptive. As an example, the adjusted clipping threshold for clipping stage i may be calculated as follows:

$Th_i' = Th_i + n_i \cdot \Delta step$, where $i=1$ to $N$ $\Delta step = 0.1$ dB $n_i \in \{0, \pm 1, \pm 2, \ldots, \pm \lfloor \Delta Th/(2 \cdot \Delta step) \rfloor\}$ $\Delta Th = Th_i - Th_{i+1} = f(PAR_t, PAR_o, N)$ where $Th_i$ is the initial clipping threshold upon setup of one configure, $Th_i'$ is the adjusted clipping threshold, $\Delta step$ is the minimal step size for one adjustment, $n_i$ is a weighting factor, $PAR_t$ is the target PAR, $PAR_o$ is the original PAR, and N is the number of clipping stages in use.

The upper/lower limit for weighting factor $n_i$ is $\pm \lfloor \Delta Th/(2 \cdot \Delta step) \rfloor$, which makes sure that $Th_i'$ is within the range of $(Th_{i-1}', Th_{i+1}')$. The relationship of the resulting count value with the lower and upper limits determines the sign of $n_i$. For example, if the current count value is lower than the lower limit, then the weighting factor n should be positive for one or more clipping stages so as to increase the thresholds to clip less; if the current count value is higher than the upper limit, then n should be minus for one or more clipping stages so as to decrease the thresholds to clip more. Though the proper value of n may be chosen based on the amount that the original PAR changes, e.g. by monitoring the change of the count values, one feasible and easy solution may be to set n at a value randomly selected from the set of $\{0, \pm 1, \pm 2, \ldots, \pm \lfloor \Delta Th/(2 \cdot \Delta step) \rfloor\}$.

According to the present invention, since clipping thresholds are adjusted with fine resolution by taking varying original PAR of input signals into account, clipping thresholds can be always tuned to their optimal points, enabling signals after CFR to have an optimal EVM for the target PAR.

Figure 4:
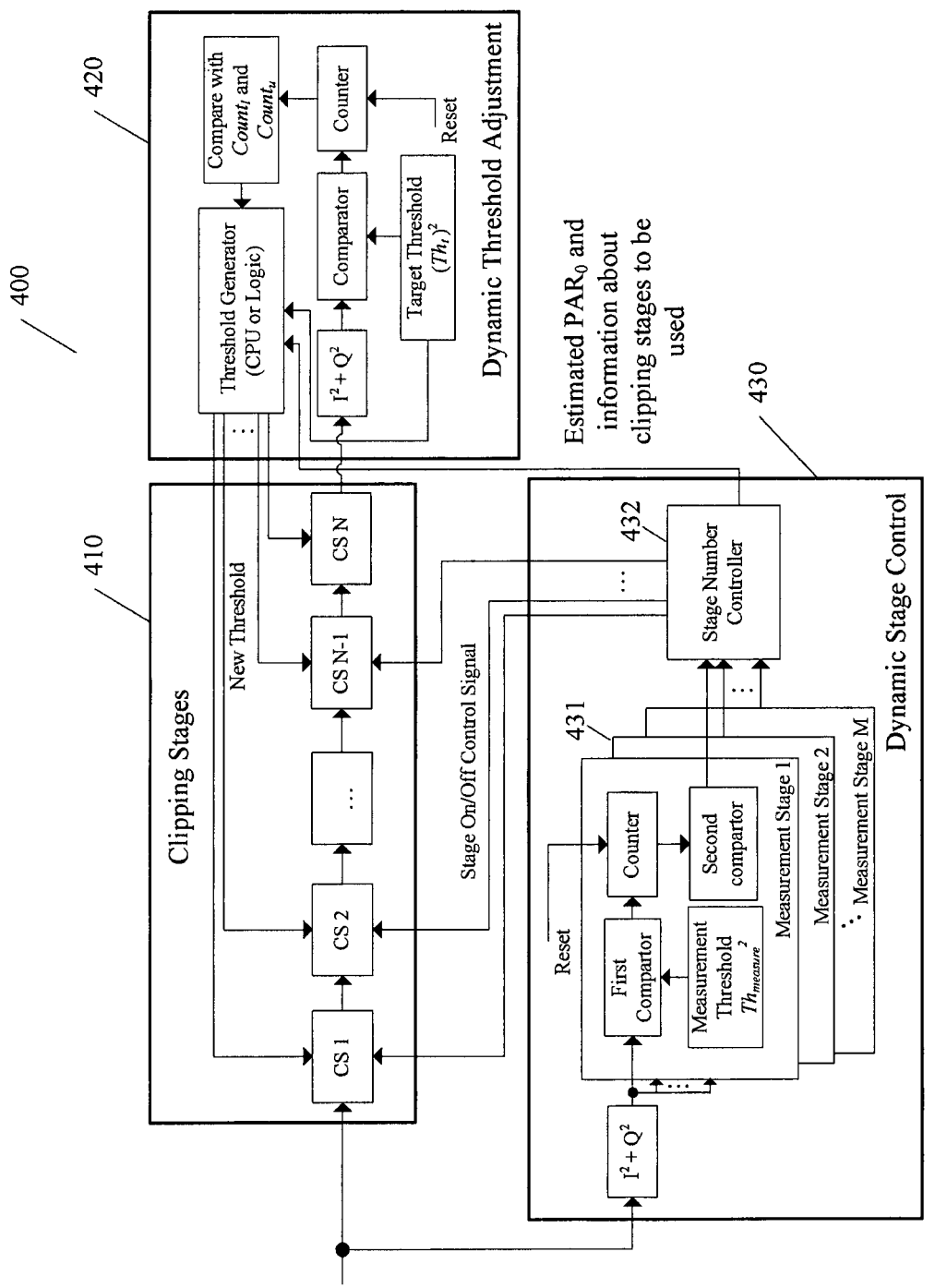
FIG. 4 schematically illustrates a block diagram of a radio unit comprising an apparatus according to an embodiment of the present invention.

FIG. 4 schematically illustrates a block diagram of a radio unit 400 according to an embodiment of the present invention. The radio unit 400 comprises clipping part 410 that includes a plurality of N clipping stages and an apparatus according to the present invention.

As shown in FIG. 4, the apparatus comprises a dynamic threshold adjustment part 420 that may implement a method according to the present invention, e.g. a process as illustrated in FIG. 3. Preferably, the apparatus may further comprise a dynamic stage control part 430.

The introduction of the dynamic stage control is in view of a scenario where the transmit power of (R)RU is backed off from $P_{RAT}$, which generally means the number of peaks over $PAR_t$ is relatively small. In this scenario, the first several clipping stages are actually wasting power and contribute little to the overall performance, thus the number of clipping stages may be reduced so as to save the power consumed for CFR.

The dynamic stage control part 430 comprises a number of measurement stages 431, e.g. MS 1 to MS M as shown in FIG. 4, for measuring the original PAR, i.e. $PAR_o$, of input signals, and a stage number controller 432.

The number of measurement stages may be determined by the required precision of $PAR_o$ measurement. Each measurement stage comprises a first comparator, a counter and a second comparator that operatively coupled. Each measurement stage is assigned to a unique reference PAR ($PAR_{o\text{-}ref}$) for e.g. evaluating whether the $PAR_o$ to be measured is around the $PAR_{o\text{-}ref}$ and applies a measurement threshold to indicate a peak amplitude corresponding to the $PAR_{o\text{-}ref}$. For each measurement stage, its measurement threshold is also unique.

According to an embodiment, the $PAR_{o\text{-}ref}$ assigned to a measurement stage may be determined as shown in Table 1.

TABLE 1

| MS No. | Assigned reference PAR ($PAR_{o\text{-}ref}$) |
|---|---|
| 1 | $PAR_{max}$ |
| 2 | $PAR_{max} - \dfrac{PAR_{max} - PAR_t}{M-1}$ |
| 3 | $PAR_{max} - 2 \cdot \dfrac{PAR_{max} - PAR_t}{M-1}$ |
| ... | |
| M − 1 | $PAR_{max} - (M-2) \cdot \dfrac{PAR_{max} - PAR_t}{M-1}$ |
| M | $PAR_t$ |

Where $PAR_{max}$ is the maximal allowable original PAR of the radio unit 400. $PAR_{max}$ is generally determined by signals in IF (Inter-Frequency) domain and may vary with different radio access technology.

Accordingly, the corresponding measurement threshold may be determined as, e.g.

$$\sqrt{P_{RAT} \cdot 10^{\frac{PAR_{ref}}{10}}}.$$

In the following, the operation of the dynamic stage control part 430 will be explained in connection with FIG. 5 that illustrates a process of dynamic stage control operation according to an embodiment of the present invention.

Figure 5:
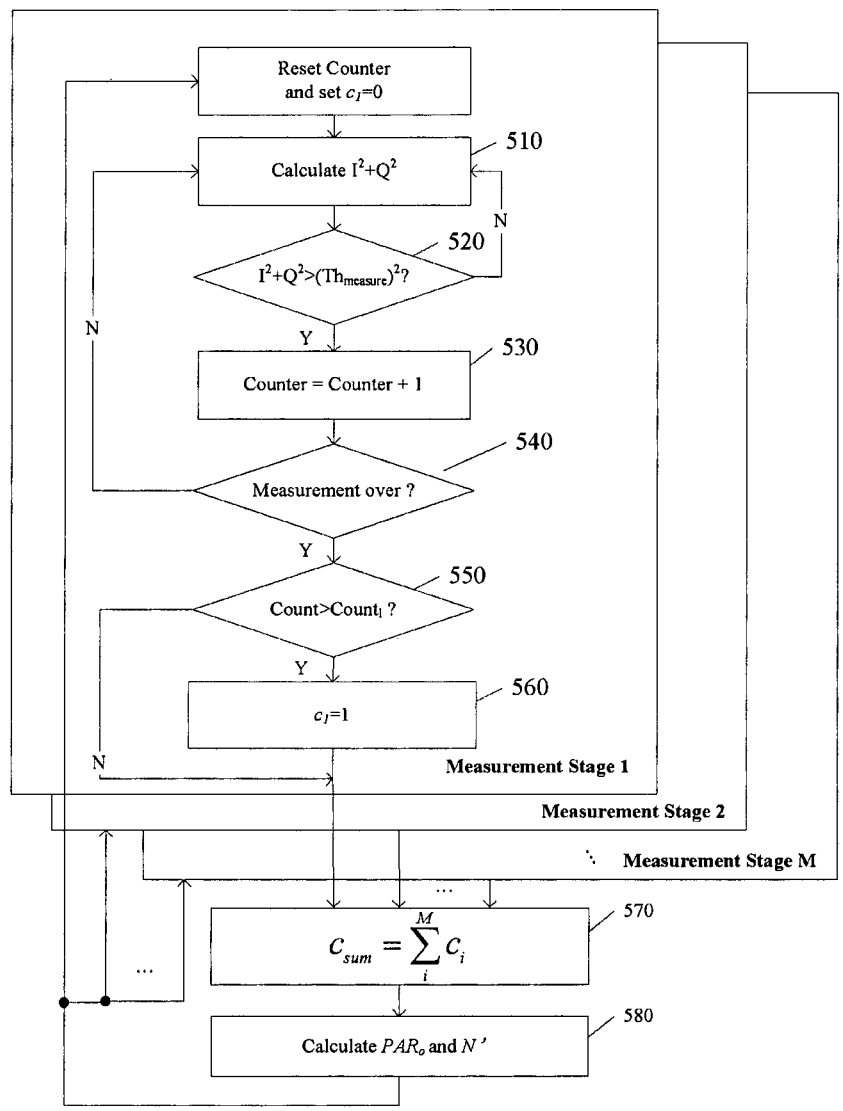
FIG. 5 schematically illustrates a process of dynamic stage control operation according to an embodiment of the present invention.

As shown in FIG. 5, after the counter is reset, the method starts in step 510, where the amplitudes of input signals are determined by calculating $I^2+Q^2$ for each input complex sample of the input signals. The calculated $I^2+Q^2$ is input into each of the measurement stages, where the first comparator compares the amplitudes of input signals with a respective measurement threshold $Th_{measure}$ by e.g. comparing $I^2+Q^2$ with $(Th_{measure})^2$ in step 520.

If the result of $I^2+Q^2$ exceeds the square of the measurement threshold, which means that the amplitude of the sample exceeds the measurement threshold, the counter is increased by one in step 530. Whether the measurement is over is determined in step 540 by monitoring a measuring time period. If the measuring time period expires, the measurement is over and the counter generates a corresponding count value. This count value is compared in the second comparator with a predetermined value, e.g. a lower limit $Count_l$, that may be calculated as above, i.e. $Count_l = \lfloor T_m \times Fs \times 10^{-4} \rfloor$, in step 550. If the count value exceeds the lower limit ($Count_l$), then it may mean current $PAR_o$ of input signal is larger than the $PAR_{o\text{-}ref}$ assigned to this measurement stage; otherwise the current $PAR_o$ is smaller than or equal to the $PAR_{o\text{-}ref}$.

The count values or comparison results of all measurement stages are transferred to the stage number controller 432, where the current $PAR_o$ is estimated based on these count values or comparison results and $PAR_{o\text{-}ref}$ assigned to respective measurement stages.

There are many ways to estimate the current $PAR_o$. According to an embodiment of the present invention, for each measurement stage i, the stage number controller 432 uses a Boolean variable $c_i$ to indicate whether the count value exceeds its respective lower limit $Count_{li}$. For example, in step 560, $c_i$ is set to 1 if the count value is higher than the lower limit $Count_{li}$, otherwise $c_i$ is set to 0, that is, $$c_i = \begin{cases} 1, & \text{if count value} > Count_{li} \\ 0, & \text{if count values} \leq Count_{li}. \end{cases}$$

The Boolean variables for all measurement stages, e.g. from 1 to M, are summed as $$c_{sum} = \sum_{i}^{M} c_i$$

in step 570. The stage number controller 432 estimates the current $PAR_o$ based on the sum and the reference PARs assigned to respective measurements stages, and determines the number of clipping stages that are to be used based on the estimated $PAR_o$ in step 580. The stage number controller 432 then selects one or more corresponding clipping stages based on the estimated $PAR_o$, and sends corresponding stage On/Off control signals to clipping stages. The stage number controller 432 controls to bypass one or more clipping stages if the determined number of clipping stages is lower than the number of clipping stages currently in use.

According to an embodiment, current $PAR_o$ may be estimated as follows:

$$PAR_o = \begin{cases} PAR_{max}, & \text{if } c_{sum} = M \\ PAR_{max} - \dfrac{PAR_{max} - PAR_t}{M-1}, & \text{if } c_{sum} = M-1 \\ PAR_{max} - 2 \cdot \dfrac{PAR_{max} - PAR_t}{M-1}, & \text{if } c_{sum} = M-2 \\ \vdots & \\ PAR_{max} - (M-2) \cdot \dfrac{PAR_{max} - PAR_t}{M-1}, & \text{if } c_{sum} = 2 \\ PAR_t, & \text{if } c_{sum} = 1 \text{ or } 0 \end{cases}$$

The number of clipping stages to be used largely depends on CFR performance and system requirements for $PAR_o$. Here CFR performance determines $PAR_{CFR}$, while $PAR_{CFR}$ is defined as the minimal PAR value for which all clipping stages are needed to work for in order to guarantee a good CFR performance, e.g. to meet a EVM requirement of the radio unit. The better the performance is, the larger $PAR_{CFR}$ can be set.

Table 2 shows an example of selection of the number of clipping stages to be used based on the estimated $PAR_O$.

| Estimated $PAR_o(PAR_o')$ | Number of Clipping Stages in Use (N') |
|---|---|
| $PAR_o' \geq PAR_{CFR}$ | N |
| $PAR_t \leq PAR_o' < PAR_{CFR}$ | $2, 3, \ldots, N-1$ |
| $PAR_o' < PAR_t$ | 1 |

Where N is the total number of clipping stages in the system, e.g. the radio unit.

Preferably, as shown in table 2, in order to protect the power amplifier in e.g. (R)RU of RBS system from great $PAR_o$ change (for example, huge $PAR_o$ change from low to high), at least one clipping stage should be used even if $PAR_o$ is smaller than $PAR_t$.

Preferably, the clipping stage will be bypassed in an order from CS1 to CS N−1. For example, if N−1 clipping stages are needed, the first stage is bypassed. If one clipping stage is needed, only the last stage works.

Preferably, the stage number controller 432 also outputs the estimated $PAR_o$ and information about the determined number of clipping stages to the dynamic threshold adjustment part 420, where they are used to e.g. recalculate the initial clipping thresholds for the selected clipping stages to be used if the determined number changes. As an alternative, this recalculation may be done by the stage number controller 432.

As an example, the initial clipping thresholds may be calculated as follows:

$$Th_1 = PAR_o' - \Delta Th$$

$$Th_{i+1} = Th_i - \Delta Th, \text{ where } i = 1 \text{ to } N'-1$$

$$\Delta Th = f(PAR_t, PAR_o', N')$$

According to an embodiment, the estimated $PAR_o$ may also be used to estimating the direction of the original PAR change. In case of a coarse estimation of $PAR_o$, the fine tuning of clipping thresholds is still done by the dynamic threshold adjustment part 420.

Since dynamic stage control enables to dynamically change the number of clipping stages according to the power or original PAR of input signals, a radio unit employing such a dynamic stage control can work for high power and original PAR signals with full performance on one hand, and work for low power or low original PAR signals with reduced power on the other hand. As an example, depending on the $PAR_o$ measurement of input signal, when there are N clipping stages in total and up to N−1 clipping stages are determined to be bypassed for low power or low original PAR signals, a power saving ratio of (N−1)/N will be achieved.

Figure 6:
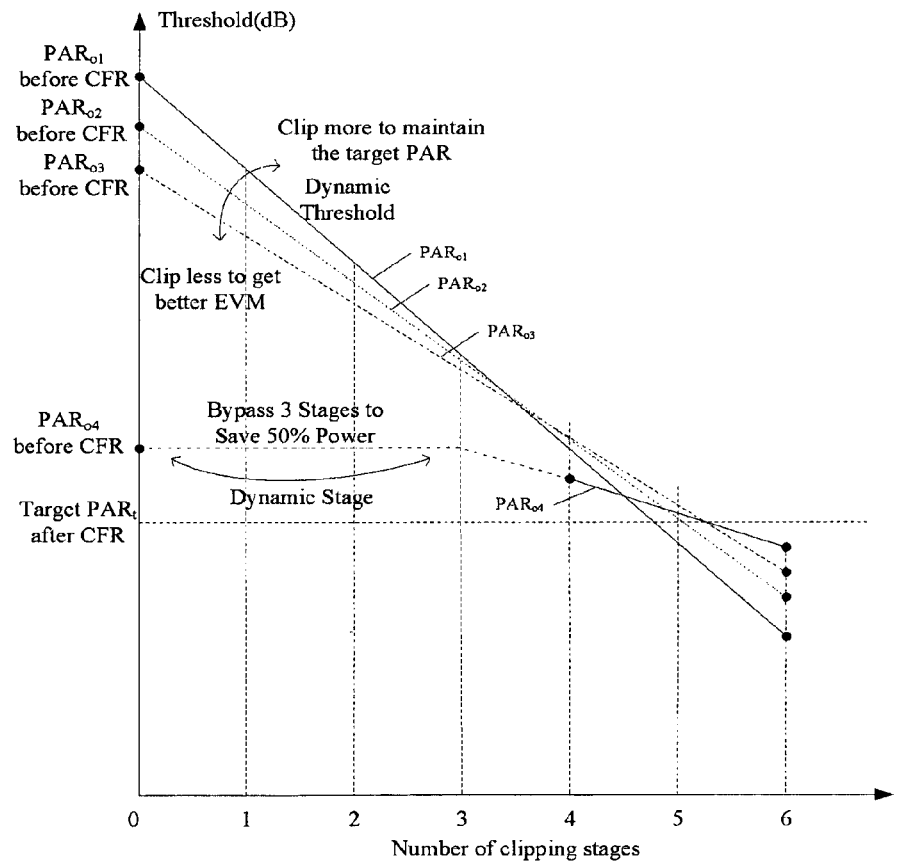
FIG. 6 schematically shows variations of clipping thresholds and clipping stages with different original PAR.

FIG. 6 shows the changes of clipping thresholds and clipping stages with varying $PAR_o$ values of input signals when implementing the present invention. For the sake of simplicity, in FIG. 6, the number of clipping stages is illustrated as 6. But as will be appreciated, the number of clipping stages may be other numbers.

As shown in FIG. 6, the line denoted by $PAR_{o2}$ indicates an initial state of clipping thresholds for respective clipping stages ($Th_1, Th_2, \ldots Th_6$) when $PAR_o$ of the input signals is $PAR_{o2}$. When $PAR_o$ increases to $PAR_{o1}$ and becomes larger than $PAR_{o2}$, clipping thresholds $Th_1, Th_2, \ldots Th_6$ are modified (as the solid line denoted by $PAR_{o1}$ shows) to clip more signals in order to keep the target $PAR_t$ unchanged; when $PAR_o$ decrease to $PAR_{o3}$ and becomes smaller than $PAR_{o2}$, $Th_1, Th_2, \ldots Th_6$ are modified to clip less signals (as the dash line denoted by $PAR_{o3}$ shows), so as to get a better EVM result. When $PAR_o$ drops to a very low level as shown by $PAR_{o4}$, the first three clipping stages are bypassed, which will save 50% power of CFR block.

As will be appreciated by one of skill in the art, the present invention may be embodied as a method, apparatus, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method for adjusting clipping thresholds for Crest Factor Reduction (CFR) in a radio unit, wherein the radio unit comprises one or more clipping stages that apply respective clipping thresholds to clip input signals, the method comprising:
   determining a target threshold for the clipping stages based on a target Peak to Average power Ratio (PAR) and amplitudes or powers of the input signals;
   estimating a direction in which an original PAR of the input signals changes by comparing amplitudes of the clipped signals from the clipping stages with the target threshold;
   adjusting the clipping thresholds based on the estimated direction.

2. The method of claim 1:
   wherein the estimating comprises generating a first count value by counting a number of clipped samples of the clipped signals of which amplitudes exceed the target threshold for a counting time period;
   wherein in response to the first count value being higher than a predetermined upper limit, the direction is estimated as increase;
   wherein in response to the first count value being lower than a predetermined lower limit, the direction is estimated as decrease.

3. The method of claim 2, wherein the upper limit and lower limit are set as a function of the duration of the counting time period, a rate of the samples, and a probability point of a Complementary Cumulative Distribution Function curve where the target PAR is defined and measured.

4. The method of claim 1, wherein the adjusting comprises:
   in response to the estimated direction being increase, adjusting the clipping thresholds to clip more signals;
   in response to the estimated direction being decrease, adjusting the clipping thresholds to clip less signals.

5. The method of claim 4, wherein the adjusted clipping threshold $Th_i'$ for clipping stage i is calculated as follows:

$$Th_i' = Th_i + n_i \cdot \Delta step, \text{ where } i = 1 \text{ to } N$$

$\Delta step = 0.1$ dB
$n_i \in \{0, \pm 1, \pm 2, \ldots, \pm \lfloor \Delta Th/(2 \cdot \Delta step) \rfloor\}$
$\Delta Th = Th_i - Th_{i+1} = f(PAR_t, PAR_{o, N})$
where $Th_i$ is the initial clipping threshold for the clipping stage i, $\Delta step$ is the minimal step size for one adjustment, $n_i$ is a weighting factor, $PAR_t$ is the target PAR, $PAR_o$ is the original PAR, and N is the number of clipping stages in use.

6. The method of claim 1, wherein the target threshold $Th_t$ is determined as:

$$Th_t = \sqrt{P_{RAT} \cdot 10^{\frac{PAR_t}{10}}}$$

wherein $P_{RAT}$ is the average power of input signals in digital domain before digital to analog conversion corresponding to the rated transmit power of the radio unit, and $PAR_t$ is the target PAR.

7. The method of claim 1, wherein the radio unit further comprises one or more measurement stages applying respective measurement thresholds, the method comprising:
   for each measurement stage:
      comparing amplitudes of samples of input signals with a measurement threshold of that measurement stage;
      generating a second count value by counting a number of samples of which the amplitude exceeds the measurement threshold during a measuring time period;
   estimating an original PAR of the input signals based on the second count value, a maximal allowable original PAR of the radio unit, and the target PAR;
   determining the number of clipping stages to be used, and selecting one or more corresponding clipping stages, based on the estimated original PAR, the target PAR, and a minimal PAR value for which all clipping stages in the radio unit are needed to guarantee the CFR performance requirement of the radio unit.

8. The method of claim 7, wherein a measurement threshold for a measurement stage is determined based on a reference PAR assigned to the measurement stage that is dependent on the maximal allowable original PAR, the target PAR, and a total number of measurement stages.

9. The method of claim 7, wherein the adjusting comprises, recalculating, in response to the determined number of clipping stages being changed, the initial clipping thresholds for the selected one or more clipping stages based on the estimated original PAR and the target PAR.

10. The method of claim 1, wherein:
    the radio unit is of a Frequency Division Duplex system or a Time Division Duplex system;
    the input signals are signals to be transmitted in downlink time slots when in a Time Division Duplex system.

11. An apparatus for adjusting thresholds for Crest Factor Reduction (CFR) in a radio unit, wherein the radio unit comprises one or more clipping stages that apply respective clipping thresholds to clip input signals, wherein the apparatus comprises:

one or more processors configured to function as:
a first determining circuit configured to determine a target threshold for the clipping stages based on a target Peak to Average power Ratio (PAR) and amplitudes or powers of the input signals;
an estimating circuit configured to estimate a direction in which an original PAR of the input signals changes by comparing amplitudes of clipped signals from the clipping stages with the target threshold;
an adjustor circuit configured to adjust the clipping thresholds based on the estimated direction.

12. The apparatus of claim 11:
wherein the estimating circuit comprises a first counter for generating a first count value by counting a number of clipped samples of the clipped signals of which amplitudes exceed the target threshold for a counting time period;
the estimating circuit is configured to estimate the direction as increase in response to the first count value being higher than a predetermined upper limit;
wherein the estimating circuit is configured to estimate the direction as decrease in response to the first count value being lower than a predetermined lower limit.

13. The apparatus of claim 12, wherein the upper limit and lower limit are set as a function of the duration of the counting time period, a rate of the samples and a probability point of Complementary Cumulative Distribution Function curve where the target PAR is defined and measured.

14. The apparatus of claim 11:
wherein the adjustor circuit is configured to adjust the clipping thresholds to clip more signals in response to the estimated direction being increase;
wherein the adjustor circuit is configured to adjust the clipping thresholds to clip less signals in response to the estimated direction being decrease.

15. The apparatus of claim 14, wherein the adjusted clipping threshold $Th_i'$ for clipping stage i is calculated as follows:

$Th_i' = Th_i + n_i \cdot \Delta step$, where $i=1$ to $N$ $\Delta step = 0.1$ dB $n_i \in \{0, \pm 1, \pm 2, \ldots, \pm \lfloor \Delta Th/(2 \cdot \Delta step) \rfloor\}$ $\Delta Th = Th_i - Th_{i+1} = f(PAR_t, PAR_o, N)$ where $Th_i$ is the initial clipping threshold for the clipping stage i, $\Delta step$ is the minimal step size for one adjustment, $n_i$ is a weighting factor, $PAR_t$ is the target PAR, $PAR_o$ is the original PAR, and N is the number of clipping stages in use.

16. The apparatus of claim 11, wherein the target threshold $Th_t$ is determined as:

$$Th_t = \sqrt{P_{RAT} \cdot 10^{-\frac{PAR_t}{10}}}$$

wherein $P_{RAT}$ is the average power of input signals in digital domain before digital to analog conversion corresponding to the rated transmit power of the radio unit, and $PAR_t$ is the target PAR.

17. The apparatus of claim 11:
further comprising one or more measurement stages applying respective measurement thresholds, each of the measurement stages comprising:
a comparator configured to compare amplitudes of samples of input signals with the measurement threshold of the measurement stage;
a second counter configured to generate a second count value by counting samples of which the amplitudes exceed the measurement threshold for a measuring time period;
a stage number controller circuit configured to:
estimate the original PAR of the input signals based on the second count value, a maximal allowable original PAR of the radio unit, and the target PAR;
determine a number of clipping stages to be used, and select one or more corresponding clipping stages, based on the estimated original PAR, the target PAR, and a minimal PAR value for which all clipping stages in the radio unit are needed to guarantee the CFR performance requirement of the radio unit.

18. The apparatus of claim 17, wherein a measurement threshold for a measurement stage is determined based on a reference PAR assigned to that measurement stage that is dependent based on a maximal allowable original PAR, the target PAR, and a total number of measurement stages.

19. An apparatus of claim 17, wherein the adjustor circuit is configured to recalculate, in response to the determined number of clipping stages being changed, initial clipping thresholds for the selected one or more clipping stages based on the estimated original PAR and the target PAR.

20. A radio base station, comprising:
one or more clipping stages that apply respective clipping thresholds to clip input signals;
a Crest Factor Reduction (CFR) circuit comprising one or more processors configured to function as:
a first determining circuit configured to determine a target threshold for the clipping stages based on a target Peak to Average power Ratio (PAR) and amplitudes or powers of the input signals;
an estimating circuit configured to estimate a direction in which an original PAR of the input signals changes by comparing amplitudes of clipped signals from the clipping stages with the target threshold;
an adjustor circuit configured to adjust the clipping thresholds based on the estimated direction.

* * * * *

UNITED STATES PATENT AND TRADEMARK OFFICE
CERTIFICATE OF CORRECTION

| | | |
|---|---|---|
| PATENT NO. | : 9,025,686 B2 | Page 1 of 1 |
| APPLICATION NO. | : 13/982413 | |
| DATED | : May 5, 2015 | |
| INVENTOR(S) | : Gu | |

It is certified that error appears in the above-identified patent and that said Letters Patent is hereby corrected as shown below:

In the specification

In Column 9, Line 15, delete "values" and insert -- value --, therefor.

In Column 9, Line 67, delete "$PAR_0.$" and insert -- $PAR_o.$ --, therefor.

In the claims

In Column 12, Line 15, in Claim 5, delete "$PAR_{o, N)}$" and insert -- $PAR_o, N)$ --, therefor.

In Column 13, Line 51, in Claim 15, delete "$PAR_{o, N)}$" and insert -- $PAR_o, N)$ --, therefor.

In Column 14, Line 37, in Claim 19, delete "An" and insert -- The --, therefor.

Signed and Sealed this
Sixth Day of October, 2015

Michelle K. Lee
*Director of the United States Patent and Trademark Office*